United States Patent Office 3,328,241
Patented June 27, 1967

3,328,241
DIBUTYL FUMARATE NEMATODE CONTROL
Herbert Schwartz, Chimes Terrace,
Vineland, N.J. 08360
No Drawing. Filed Sept. 14, 1965, Ser. No. 487,303
5 Claims. (Cl. 167—22)

The invention relates to novel compositions and methods of combating plant pathogenic nematodes wherein the active ingredient is a dibutyl ester of fumaric acid.

Nematodes are round worms which infest soil and attack virtually all cultivated plants throughout the world. Plants infected by pathogenic nematodes have a weakened, sick appearance and their roots display a stunted appearance, numerous galls, knots or lesions and various other manifestations depending upon the type of plant and the specific nematode involved. The entire plant often has the appearance of being nutritionally deficient.

Known methods and compositions for the control of nematodes have usually been inconvenient to use or too expensive for widespread application. Many such nematodes are highly injurious not only to man and animals but also to plants and seeds.

It is an object of the invention to provide novel inexpensive nematocidal compositions.

It is a further object of the invention of combating nematodes.

These and other objects and advantages of the invention will become obvious from the following detailed description.

The novel compositions for controlling nematodes are comprised of at least one dibutyl fumarate and an inert carrier. The dibutyl fumarate may be di-n-butyl fumarate, di-isobutyl fumarate, di-sec.-butyl fumarate and/or di-tert.-butyl fumarate.

The said dibutyl fumarates can be prepared by any known procedure for making diesters of dicarboxylic acid such as reacting the desired butyl alcohol with fumaric acid in the presence of an acidic catalyst at reflux temperatures wherein the alcohol acts as solvent as well as reactant. Other known ester synthesis may be used.

The said compositions can be applied in any of a variety of compositions. They may be used as simple aqueous solutions or suspensions but are preferably extended with adjuvants such as inert solids, surface active agents and/or organic liquids.

Solid formulations can be prepared with inert powders. The formulations thus can be homogeneous powders that either can be used as such, diluted with inert solids to form dusts, or suspended in a suitable liquid medium for spray application.

The powders usually comprise active ingredients admixed with minor amounts of conditioning agent. Natural clays (either absorptive such as attapulgite or relatively non-absorptive such as china clays), diatomaceous earth, walnut shell flour, redwood flour, synthetic fine silica, calcium silicate and other inert solid carriers of the kind conventionally employed in powder fungicidal compositions can be used. Industrial fertilizers and even dry soil can sometimes be used.

The active ingredient usually makes up from about 1–95% by weight of these powder compositions. The solids ordinarily should be very finely divided and should have a particle size below about 50 microns and preferably below about 20 microns. For conversion of the powders to dust formulations, talc, pyrophyllite, tobacco dust, volcanic ash and other dense, rapid-settling inert solids customarily are used.

The active compound can be sprayed or in any other desired manner applied to an absorptive powder which can then be dried to produce a dry product. Any of the above absoprtive materials can be used for the preparation of such products.

Liquid compositions including the active compounds above described can be prepared by admixing the compound with a suitable liquid diluent medium. The active compound can be either in solution or in suspension in the liquid medium. Typical of the liquid media commonly employed are kerosene, Stoddard solvent, xylene, alcohols, alkylated naphthalene, diesel oil, glycols and ketones such as di-isobutyl ketone, cyclohexanone, etc. Stoddard solvent, as is well known in the art, is a petroleum distillate characterized in a distillation test by not less than 50% being received by 350° F., not less than 90% being received by 375° F., and the end point not being over 410° F. It is further defined in "Encyclopedia of Chemical Technology," edited by R. E. Kirk and D. F. Othmer, volume 5, p. 216. The active ingredient usually makes up from about 0.5 to 50% of these liquid compositions. Some of these compositions are designed to be used as such, and others to be extended or emulsified with large quantities of water.

Nematocidal compositions in the form of wettable powders or liquids can also include one or more surface-active agents such as wetting, dispersing, or emulsifying agents. Thus mixtures of the above liquids with the active compounds can contain an emulsifying agent to make an emulsifiable oil composition. The surface-active agents cause the compositions to disperse or emulsify easily in water to give aqueous sprays. Generally the surface-active agents will not comprise more than 5 to 10% by weight of a composition and in some compositions the percentage will be considerably less than 1%.

The surface-active agents employed can be of the anionic, cationic, or nonionic type. They include for example, sodium oleate, sulfonated petroleum oils, alkyl aryl sulfonates, sodium lauryl sulfate, polyethylene oxides, lignin sulfonates, and other surface-active agents. A detailed list of such agents is set forth in an article by McCutcheon in "Soap and Chemical Specialties," volume 31, No. 7, pages 50–61; No. 8, pages 48–61; No. 9, pages 52–67; and No. 10, pages 48–67 (1955). See also McCutcheon in "Chemical Industries," November 1947, page 811, entitled "Synthetic Detergent"; and Bulletin E–607 of the Bureau of Entomology and Plant Quarantine of the U.S. Department of Agriculture.

In general, the nematocidal compositions are applied to cultivated land and mixed with top soil. The active compound or compounds present in the compositions are applied in an amount sufficient to exert the desired nematocidal action. The exact dosage necessary is, of course, dependent upon the particular active ingredient or ingredients employed, the nature of the formulation used, the type of treatment, the type and quantity of nematodes to be controlled, duration of treatment desired, climatic conditions and the like.

As a practical matter, application rates of from 1 to 200 pounds, preferably 10 to 50 pounds, per treated acre generally are satisfactory for nematode control, although larger rates can be used.

In the following examples there are described several preferred embodiments to illustrate the invention. However, it should be understood that the invention is not intended to be limited to the specific embodiments.

*Example I*

To demonstrate the criticality of the dibutyl grouping for effective nematocidal activity, tests were carried out in stoppered test tubes containing 10 cc. of an aqueous solution containing 5 p.p.m. of the compounds tested and the nematode population at the time of seeding was adjusted to 50 to 75 per test tube. The tests were effected in duplicate and the blanks contained the nema in tap water. A species of Panagrellus, an active saprozoic nematode was used. Daily observations of the nematodes were made to observe the percent of mortality which was easily determined because of the active and constant movement of live nematodes of this species. The results are summarized in Table I.

TABLE I

| Compound | Percent Mortality | | |
|---|---|---|---|
| | 1st Day | 3rd Day | 5th Day |
| Dimethyl fumarate | 0 | 0 | 0 |
| Diethyl fumarate | 0 | 0 | 0 |
| Dipropyl fumarate | 0 | 0 | 0 |
| Dibutyl fumarate | 85 | 100 | 100 |
| Diamyl fumarate | 0 | 0 | 0 |
| Dihexyl fumarate | 0 | 0 | 0 |
| Dibutyl succinate | 0 | 0 | 0 |
| Dibutyl maleate | 0 | 0 | 0 |

The test data of Table I clearly shows that dibutyl fumarate is extremely nematocidal to Panagrellus while the higher and lower homologous ester of fumaric acid and the dibutyl esters of succinic and maleic acids do not possess nematocidal activity under the test conditions.

*Example II*

ROOT KNOT POT TEST

Various compounds were subjected to the following pot test for evaluating their effectiveness in controlling root knot nematodes (*Meliodogyna hapla*). Ordinary greenhouse potting soil was admixed with soil heavily infected with root knot nematode to obtain a high inoculum potential. Heavily knotted tomato roots were then added to the soil mixture and the entire mass was allowed to cure for two weeks to permit escape of larvae from the galls contained on the infected roots. The test chemicals were prepared as 25% wettable powders in a pre-mix consisting of 92% by weight of Hi Sil 232 (a hydrated silica pigment), 4% by weight of Marasperse N (a ligno sulfonate) and 4% by weight of Pluronic L 61 (an ethylene oxide-propylene oxide condensation product) which was then diluted with an equal amount of Continental clay. The said powder was then mixed with the infested soil at a dosage of 200 pounds per acre and the soil mixture was then thoroughly tumbled to assure uniform and thorough distribution of the chemicals throughout the soil mass.

The treated soil was then placed in four 4-inch plastic pots for each chemical and loosely covered with petri dishes for five days and then 4 to 7 seedling tomato plants were planted in the pots. The plants were allowed to grow for a month and then the plants were removed from the pots and thoroughly washed to remove all adhering debris and to expose the clean roots for counting of the root knot galls. The average number of galls per plant in each pot was then determined and the overall average was determined as the root knot index. The results are summarized in Table II.

TABLE II

| Compound | Average Galls Per Plant | | | | Root Knot Index |
|---|---|---|---|---|---|
| | Pot 1 | Pot 2 | Pot 3 | Pot 4 | |
| Di-n-propyl fumarate | 31 | 34 | 62 | 37 | 41 |
| Di-isopropyl fumarate | 27 | 19 | 19 | 16 | 20 |
| Dibutyl succinate | 17 | 27 | 21 | 26 | 23 |
| Dibutyl maleate | 23 | 29 | 19 | 21 | 22 |
| Di-isobutyl fumarate | 1 | 10 | 10 | 14 | 8 |
| D—D | 36 | 18 | 21 | 23 | 24 |
| Check | Plants mostly killed due to heavy root knot infestation. | | | | |

The inoculum potential in the soil was very high as can be seen from the fact that the check plants were essentially killed. D—D, which is a mixture of dichloropropane and dichloropropene, is a commercial nematocide and was used as a standard. As can be seen from Table II, di-isobutyl fumarate possesses an excellent nematocidal activity and is three times more active than the commercial nematocide, D—D.

Various modifications of the compositions and method may be made without departing from the spirit or scope thereof and it is to be understood that the invention is to be limited only as defined in the appended claims.

What is claimed is:

1. A method of controlling nematodes which comprises incorporating into soil an effective amount of at least one dibutyl fumarate.

2. A method of controlling nematodes which comprises incorporating into soil an effective amount of di-n-butyl fumarate.

3. A method of controlling nematodes which comprises incorporating into soil an effective amount of di-iso-butyl fumarate.

4. The method of claim 1 wherein the said fumarate is applied to the soil in an amount of 10 to 200 pounds per acre.

5. The method of claim 1 wherein the said fumarate is applied to the soil in an amount of 10 to 50 pounds per acre.

References Cited

UNITED STATES PATENTS

| 2,218,181 | 10/1940 | Searle et al. | 167—22 |
| 2,333,666 | 11/1943 | Moore et al. | 167—22 |
| 2,852,426 | 9/1958 | Stansbury | 167—22 |
| 2,937,969 | 5/1960 | Bruce | 167—22 |
| 2,991,219 | 7/1961 | Bruce | 167—22 |
| 3,018,217 | 1/1962 | Bruce | 167—22 |

LEWIS GOTTS, *Primary Examiner.*

SHEP K. ROSE, *Assistant Examiner.*